350-266

March 22, 1960 E. D. CROSS 2,929,871

MASK FOR FACSIMILE SCANNER

Filed Aug. 27, 1953 3 Sheets-Sheet 1

INVENTOR
EDWARD D. CROSS

BY George W. Price

ATTORNEY

March 22, 1960 E. D. CROSS 2,929,871

MASK FOR FACSIMILE SCANNER

Filed Aug. 27, 1953 3 Sheets-Sheet 2

INVENTOR
EDWARD D. CROSS

BY George W. Price

ATTORNEY

March 22, 1960 E. D. CROSS 2,929,871
MASK FOR FACSIMILE SCANNER
Filed Aug. 27, 1953 3 Sheets-Sheet 3
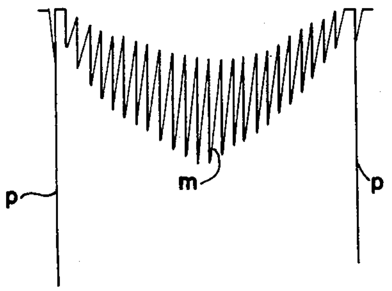
FIG. 7
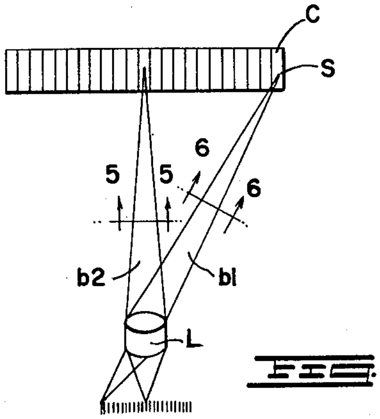
FIG. 4.
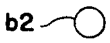
FIG. 5. FIG. 6.
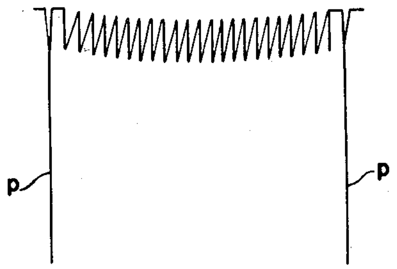
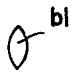
FIG. 9. FIG. 10.
FIG. 8.
INVENTOR
EDWARD D. CROSS
BY George W. Price
ATTORNEY 2,929,871
Patented Mar. 22, 1960

2,929,871

MASK FOR FACSIMILE SCANNER

Edward D. Cross, Brockton, Mass.

Application August 27, 1953, Serial No. 376,834

1 Claim. (Cl. 178—7.1)

In facsimile scanners such as the type wherein transverse elements of the copy are successively scanned as they are moved adjacent an elongated slot, the light reaching the photoelectric cell from the edges of a copy having a uniform density is materially less than that received from the central portions. This phenomenon apparently is caused by several factors including among others the reduction in the amount of light falling on the lens system from the end portions of the slot because of the greater angle of incidence of the light rays on the surface of the lens system, the longer light path, the reduced output of the ends of the elongated electric lamps illuminating the slot which further decreases with age, the thickness of the material forming the helical aperture and the non-linearity of response of the light sensitive electrode of the photoelectric cell. The net result of these factors is a non-uniform electrical output from the photoelectric cell which is undesirable because of the variations in contrast in the record.

It is accordingly the principal objects of this invention to provide means which improves the output characteristics of a facsimile scanner; which provides compensation so that the electrical output is constant for copy of uniform density, which is simple and economical to construct, which can be incorporated in existing scanners, which has no moving parts, which is readily adjustable, and which advances the facsimile art generally.

These and other objects will be apparent from the following description of a specific embodiment of the invention which refers to drawings wherein:

Fig. 4 is a schematic view showing the path of the light rays in the scanner shown in Fig. 3;

Figs. 5 and 6 are sectional views on line 5—5 and 6—6 respectively of Fig. 4 when no mask is used;

Fig. 7 is a voltage time diagram of the output of the scanner without a mask;

Fig. 8 is a similar diagram when a mask is used in the scanner; and

Figs. 9 and 10 are sectional views taken on lines 5—5 and 6—6 of Fig. 4 when a mask is used.

Figure 3:
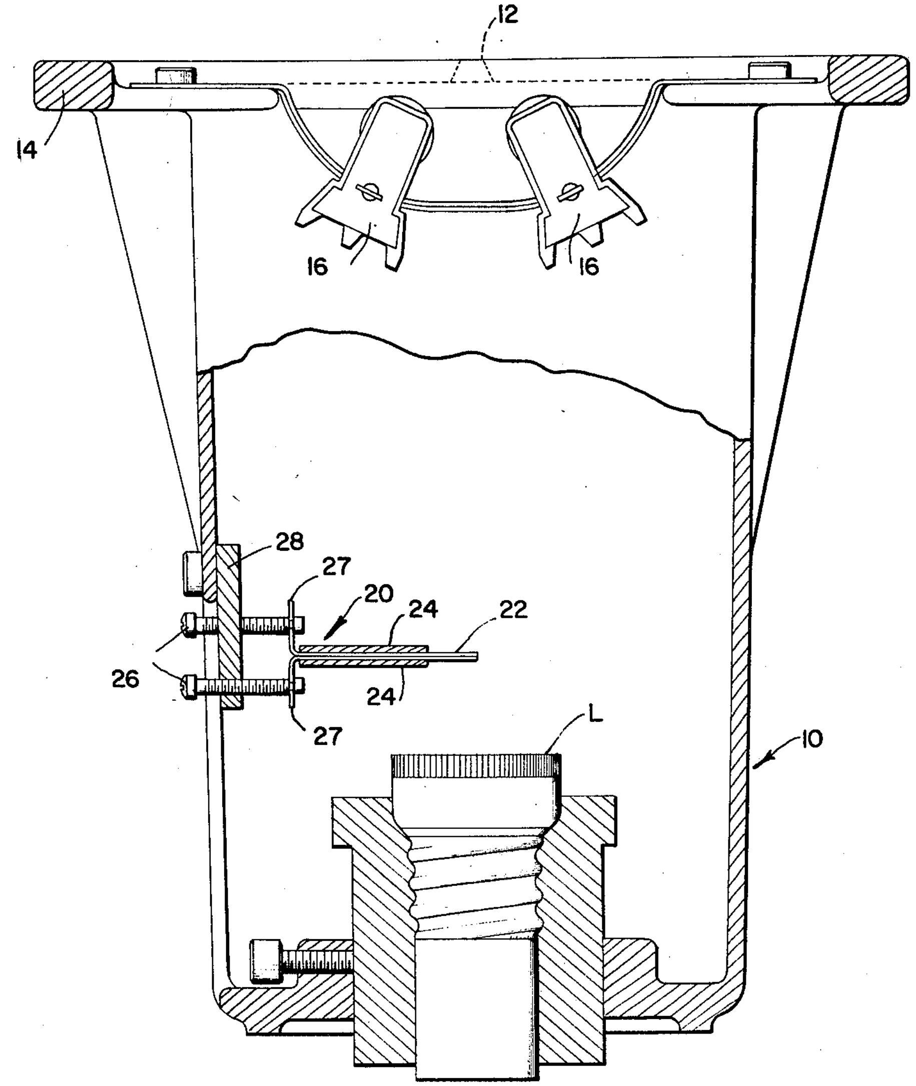
Fig. 3 is a fragmentary side elevation view of scanner having a portion of the side wall broken away to show the position of the mask.

A scanner 10 only the upper portion of which is illustrated in Fig. 3 is of the type wherein the copy is fed by a transverse slot 12 in a table 14 by feeding means such as rolls which form no part of the present invention and are not shown. The transverse elements of the copy exposed at the slot 12 are brightly illuminated by two elongated tubular lamps designated generally at 16 so that light rays are reflected from the copy and directed by the lens system L to impinge upon a photoelectric cell (not shown). Scanning is obtained by the relative movement of linear and helical optical apertures, such as is illustrated in patent application Ser. No. 240,418, filed August 4, 1951, wherein the above discussed elements are all shown and described in detail.

It has been found that with the above scanner if copy consisting of alternate black and white bands such as is shown at C (Fig. 4) is fed lengthwise of the bands so that an effective elemental scanning area, such as the scanning spot S, moves transversely thereto, the electrical output of the photocell for one complete scanning movement lengthwise of the slot 12 varies according to the voltage-time diagram of Fig. 7 forming a trace such as would be recorded by an oscillograph. It will be noted that with a copy having an alternate band of black and white with a uniform contrast therebetween the average signal strength increases from a minimum at the beginning of the scanning stroke at one end of the slot 12 (Fig. 3) to a maximum *m* corresponding to the center portions of the slot and then again decreases to a minimum at the other end of the slot.

The peaks 2 at either end of the diagram are caused by the synchronizing or framing pulses of the scanner. Although as discussed heretofore a number of factors are apparently involved in this phenomenon one of the principal factors appears to be the reduction of light transferred to the photoelectric cell by lens system L from the scanning spot S when it is near the ends of the slot as compared with the light when the spot is near the center, as can clearly be seen by comparing the areas of the cross sections of the light beams *b*1 and *b*2 (Figs. 5 and 6) taken in planes normal to the axis of the lens system.

Figure 1:
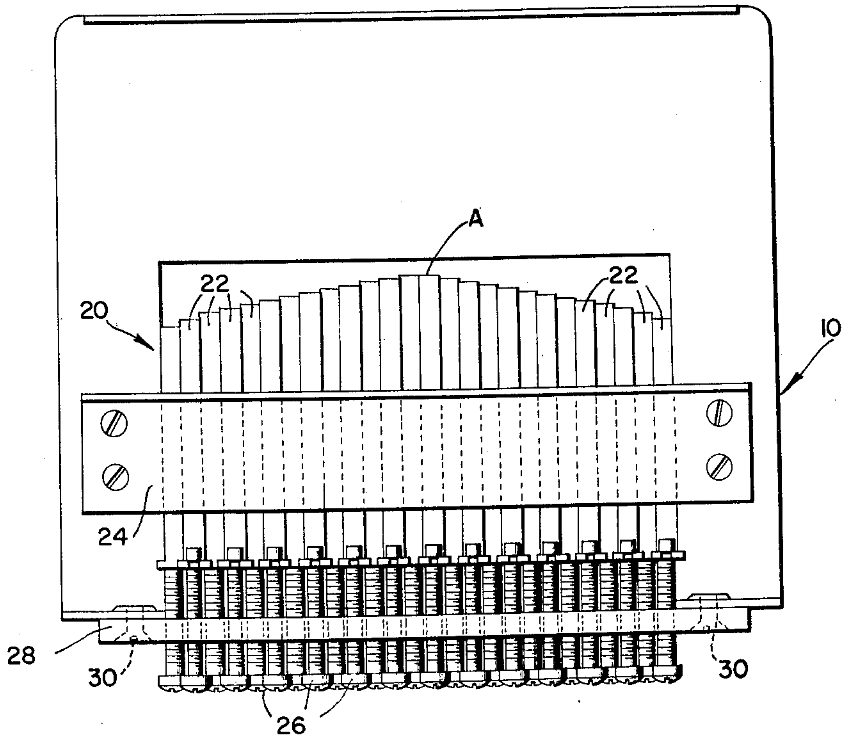
Fig. 1 is a plan view of a mask for an optical facsimile scanner.
Figure 2:
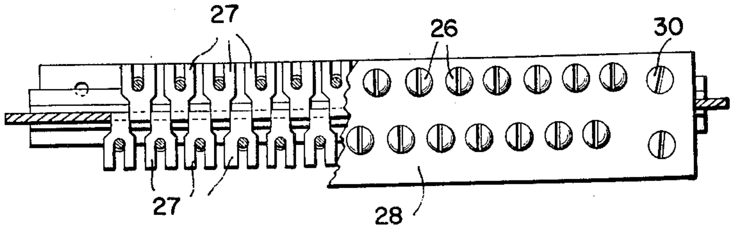
Fig. 2 is a side elevation view with portions broken away.

To regulate the amount of light impinging upon the photoelectric cell for similar copy irrespective of the instantaneous position of the scanning spot S, I interpose a mask 20 between the slot 12 and the lens system L as is shown in Fig. 3. As is best illustrated in Figs. 1 and 2 the mask comprises a diaphragm formed of a plurality of fingers 22 which are supported between two horizontally spaced plates 24. Alternate fingers 22 are arranged respectively in two parallel planes which arrangement permits the edges of each finger to overlap the edges of adjacent fingers without interference and at the same time precluding the leakage of light rays therethrough. The fingers 22 are individually adjustable by means of respective screws 26 the ends necked-down of whose shanks engage the bent bifurcated portions 27 at the ends of the fingers. The screws 26 engage threaded apertures in a supporting block 28 which is in turn attached to the side wall of the scanner 10 by screws 30.

It will be evident that the above described arrangement permits each finger to be moved in and out of the path of the light rays from the moving scanning spot S which impinge upon the lens system L and that if the fingers 22 are adjusted so that the periphery of the resulting diaphragm is fan-shaped as at A more light coming from the center portion of the slot 12 will be blocked than rays coming from the end portions, i.e., the beam *b*1 from the ends of the slot will not be modified appreciably. As shown in Fig. 9, the beam from the central portions of the slot 12 will have a segment *b'*2 of its light rays blocked whereas the beam from the end portions of the slot is not appreciably modified, so that the amount of light impinging upon the photoelectric cell from any position of the scanning spot along the slot 12 is adjustable by moving of the fingers 22 to be approximately the same, and the electrical output of the cell for a uniform copy will be as indicated in the voltage-time diagram of Fig. 8.

It will be evident that although an adjustable diaphragm such as described above has the advantage of permitting adjustments to be made to compensate for the aging of photoelectric cells and for variations between different photoelectric cells, it is also possible to obtain adequate compensation for the other factors causing variations in the amount of light reaching the photoelectric cell by substituting a non-adjustable dipahragm formed, for example, of a sheet of metal having a periphery shaped substantially similar to the outline of the ends of the fingers 22 when in the position indicated at A.

I claim:

The method of optically scanning a subject copy as in a facsimile system comprising the steps of feeding the copy lengthwise at a substantially constant rate, illuminating successive transverse elements of the copy as it is fed, scanning sequential incremental areas of the illuminated transverse element to form a beam of light rays which moves in a plane passing through the scanned transverse element, focussing the moving light beam to impinge upon a light sensitive device so that its output varies as a function of the copy contrast, and blocking a greater percentage of the light from the incremental areas disposed centrally of the scanned transverse element than from the incremental areas adjacent either end thereof so that substantially constant amounts of light impinge upon the light sensitive device from all the incremental areas of a non-contrasting transverse element.

References Cited in the file of this patent

UNITED STATES PATENTS

| | | |
|---|---|---|
| 1,807,011 | Ranger | May 26, 1931 |
| 1,828,000 | Ranger | Oct. 20, 1931 |
| 2,094,318 | Failla | Sept. 28, 1937 |
| 2,298,911 | Young | Oct. 13, 1942 |
| 2,410,550 | Padva | Nov. 5, 1946 |
| 2,431,824 | Poch | Dec. 2, 1947 |
| 2,474,380 | Simmon | June 28, 1949 |
| 2,528,020 | Sunstein | Oct. 31, 1950 |
| 2,557,691 | Rieber | June 19, 1951 |
| 2,672,799 | Terwilliger | Mar. 23, 1954 |